UNITED STATES PATENT OFFICE.

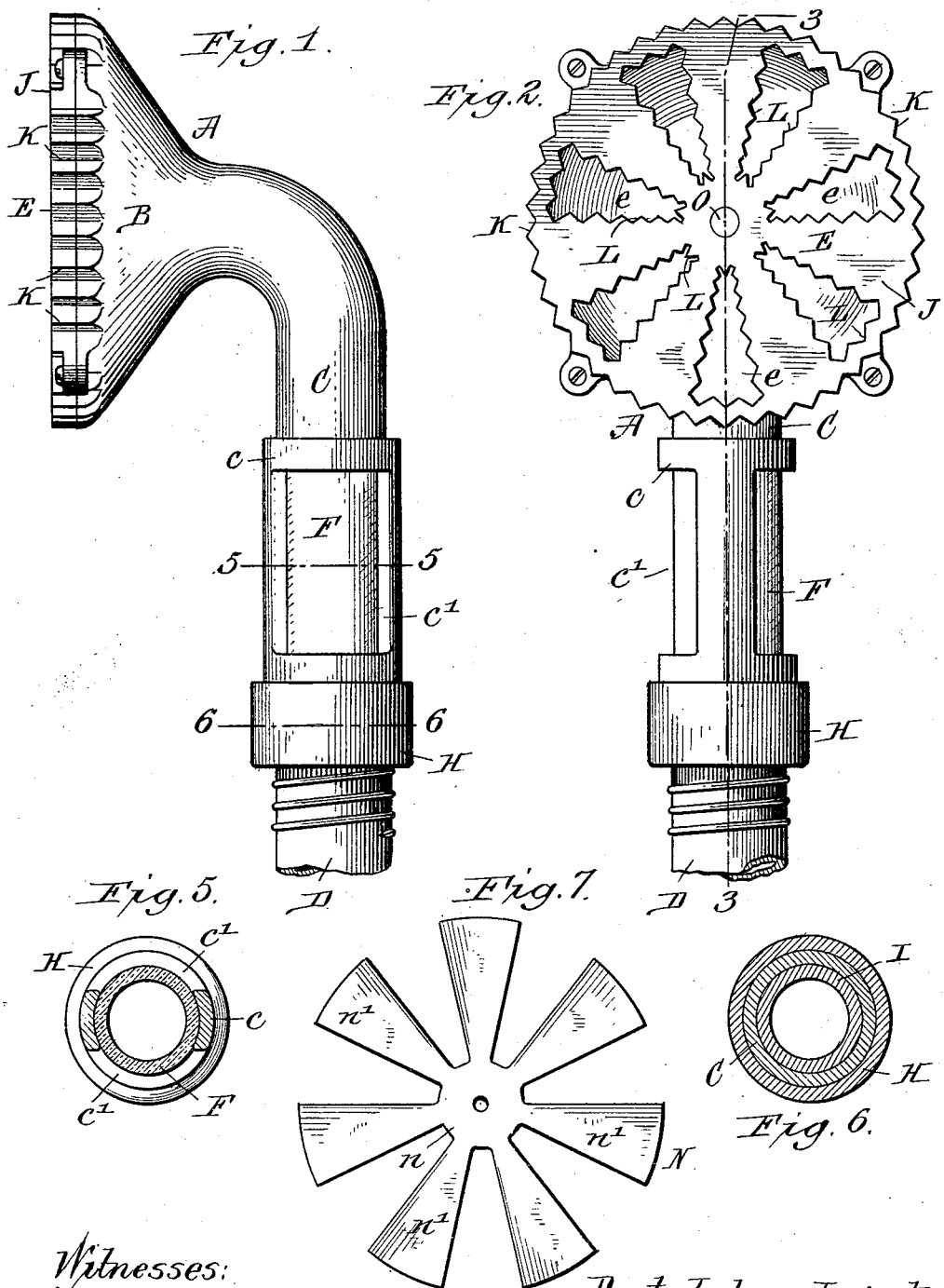

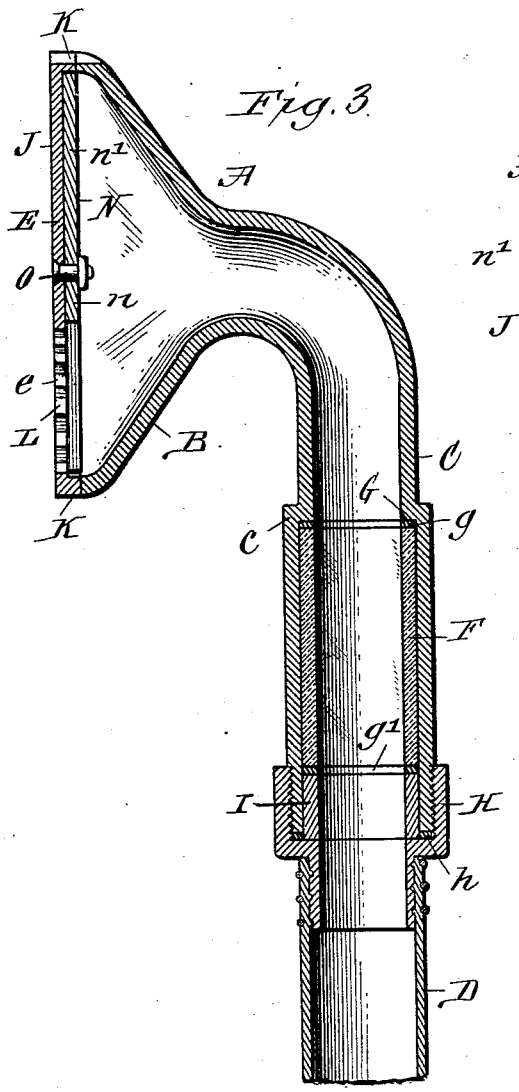

BART LOBEE, OF BUFFALO, NEW YORK.

HORSE-CLEANING IMPLEMENT.

977,106.

Specification of Letters Patent.  Patented Nov. 29, 1910.

Application filed March 30, 1909. Serial No. 486,794.

*To all whom it may concern:*

Be it known that I, BART LOBEE, a citizen of the United States, residing at Buffalo, in the county of Erie and State of New York, have invented certain new and useful Improvements in Horse-Cleaning Implements, of which the following is a specification.

My invention relates primarily to a horse cleaning - implement; but it may be as readily used for cleaning carpets, cushion-seats, clothing, and various other objects.

The primary object of my invention is to provide a cleaning-implement to be used in conjunction with a pump or fan acting to produce within said cleaning-implement a partial vacuum for the purpose of extracting dust and dirt from the object over which the implement is moved or scraped, without in any manner injuring the surface over which said implement is moved; and particularly when used for the purpose of cleaning a horse or other animal without injuring tender or sore places of the skin.

Another object of my invention is to provide an implement of this type with a regulating-device for closing the openings through which the dust and dirt is drawn to any extent desired so that the operator can regulate the suction-action on the skin of the animal for best results, and so that there will be no possibility of blisters forming upon the skin.

Other objects of my invention are to so construct the cleaning-implement, that there will be no parts projecting beyond the contact face thereof; thus rendering the implement adaptable for use on smooth surfaces without tendency of injuring the finest material; to provide the sides of the implement and the confining walls of the openings with serrations acting upon the animal to lift the hair to expose to suction the skin underneath; also to raise the nap of carpets or rugs to expose to suction the interstices between the nap and also the foundation to which the nap is secured; to provide means whereby the dust and dirt drawn in through the handle of the implement can be readily seen, thus making it possible to ascertain when the animal or object over which the implement is moved is thoroughly cleaned.

A further object is to provide a simple and inexpensive cleaning-implement which possesses all the advantages of similar implements now in use, without the disadvantages which said implements possess by reason of their having toothed flanges extending from the contact face and acting to injure the skin when used on animals, or to injure the surface of clothing, draperies, cushions or the like when used for cleaning the same.

To these ends the invention consists in a hollow structure having its end provided with a number of inlet-openings whose confining walls are serrated and having also serrations around the perimeter of said structure; it further consists in the provision of means for regulating the size of said openings, particularly desirable at a certain season of the year when horses shed their coat; and it further consists in the construction, arrangement, and combination of parts to be hereinafter described and particularly pointed out in the subjoined claims.

In the drawings,—Figure 1 is a side elevation of my improved cleaning-implement. Fig. 2 is a face view of the same with the inlet-openings entirely open. Fig. 3 is a longitudinal section taken on line 3—3, Fig. 2. Fig. 4 is a face view of the implement with the regulating closure moved to partly close the inlet-openings. Fig. 5 is a transverse section through the handle taken on line 5—5, Fig. 1. Fig. 6 is a transverse section through the handle taken on line 6—6, Fig. 1. Fig. 7 is a face view of the regulating-closure.

Referring now to the drawings in detail, similar letters of reference refer to corresponding parts in the several figures.

The reference letter A designates the cleaning implement, which may be termed a curry-comb when used for cleaning horses or other animals, and it comprises a substantially conical body B having a tubular extension C arranged at right-angles thereto which serves as a handle. To the end of said handle one end of a flexible tube D is secured whose other end is attached to a fan or pump, or if desired, it may be attached to a vacuum or dust-separating tank which will be connected with the fan or pump. The outer or large end of the conical body B is closed, preferably by a removable plate E having inlet-openings $e$ in a circular series and radially-disposed.

The handle C is enlarged, as at $c$, and provided with sight-openings $c^1$ and into said enlarged portion of the handle, a glass or other transparent tube F is inserted to close the openings $c^1$. By enlarging the handle as described, an internal shoulder G is provided; between which and the inner end of said transparent tube a gasket $g$ is interposed. The outer end of the handle is externally threaded and has a coupling H threaded thereon to which the flexible tube D is connected. Between said coupling and the outer end of said handle, a gasket $h$ is interposed, and a nipple I is provided, against one end of which said coupling bears for the purpose of forcing the transparent tube F against the gasket $g$. A gasket $g^1$ is interposed between the inner end of said nipple and the outer end of said transparent tube.

The transparent tube, the gaskets $g$ and $g^1$, the nipple I, and the outer portion of the coupling H, have the same internal diameter and correspond with the internal diameter of the smaller or inner end of the handle; thus providing a smooth bore from the conical body of the flexible tube D which prevents lodgment of dust and dirt within the cleaning-implement.

While the connection of the cleaning-implement to the flexible tube herein shown and described, is now believed to be the best adapted for the purpose, any other suitable coupling may be provided at such point.

The outer contact-surface J of the hollow body is preferably smooth; and for this reason can be used on smooth surfaces, such as silk or satin draperies, cushions, pillows, clothing, or on any other similar articles.

As this implement is particularly designed for the purpose of cleaning horses and other animals, I provide the perimeter of the hollow body with serrations K, or I otherwise roughen the sides of the body at the lower end so that in passing the implement over the skin of a horse or other animal, the roughened edge thus provided, will lift the hair of the animal and expose all parts thereof where the implement is in contact as well as the skin underneath to the action of suction created by the pump or fan to which the implement is connected.

By providing a smooth or plane contact-face with a serrated or otherwise roughened edge, a curry-comb is provided which can be passed over the skin of an animal without injuring tender or sore places thereof and yet possess the qualities to raise the hair and expose the skin underneath.

The openings in the closed end or plate of the hollow body have their confining walls serrated or otherwise roughened, as at L, and the teeth of these serrated walls also act to lift the hair of the animal and expose the skin underneath so that any of the hairs that may not have been lifted by the serrated edge of the body, will assuredly be lifted by one or the other of the serrated walls of the openings, thus assuring a thorough cleaning of every portion of the animal over which the implement or curry-comb is passed.

The serrated walls of the inlet-openings $e$ and the serrated edge of the body will also act in a similar manner to raise the nap of carpets or rugs, and owing to the fact that these serrations lie in planes at right-angles, or substantially so, to the contact-face of the implement, the latter may be used as effectively for cleaning articles or objects having smooth surfaces. In fact silks or satins may be cleaned with this implement without liability of marking or injuring the same in any manner.

In order that the serrated or otherwise roughened walls of the inlet-openings $e$ will act to lift the hair of an animal or raise the nap of a carpet or other object, the openings $e$ are made of comparatively large size so that in passing over the hair or nap when pressing upon the implement, the hair or nap will extend up into said openings; and when the serrated walls of said openings come in contact therewith during the movement of the implement, the hair or nap is lifted to expose the skin or foundation, as the case may be, to the action of suction, thus permitting all dust and dirt adhering to the hair or nap and the skin or foundation, to be drawn through the inlet-openings $e$ into the hollow body, through the handle thereof and the flexible tube connected to said handle, and from said tube into a dust separating-tank, or into the fan to be expelled therefrom.

When using this implement upon animals having tender skin, I close the inlet-openings of the hollow body to a certain extent so that the suction-action upon the animal is reduced and thus the formation of blisters is entirely prevented. For this purpose I have provided a closure N which lies against the inner face of the apertured wall or plate E and comprises a hub $n$ and wings or arms $n^1$ of a length that they will extend to the outer ends of the openings $e$ and of a width so that they may entirely close said openings. Said closure is held to the end wall or plate E by a pivot bolt O so that it may be rotated to open the openings or close the same entirely or to any extent desired. The radial portions of the plate or end wall E between the radial openings $e$ correspond in width to the width of the openings, and therefore the arms or wings of the closure N can lie in planes between said openings, or the closure may be rotated to any degree to close the openings to the extent desired for best results. This closure is very desirable for use in horse cleaning-implements when horses shed their coats, at which times the openings in the hollow body may be opened to their full extent so that the loose hair will freely enter said body. For some classes of work the closure N may be dispensed with and in such cases the conical body B may be cast in one piece with the inlet-openings e in its closed outer end.

The transparent tube F in the handle is another very desirable feature of my invention since it permits the operator to ascertain when the cleaning operation is completed, as the dust and dirt drawn through the implement can be seen through the glass tube.

Where herein reference is made to serrations, it is to be understood as including undulations, or any other roughening of the perimeter or of the confining walls of the inlet-openings e, so long as such roughening serves to lift the hair of an animal or raise the nap of a carpet or rug.

Changes in minor details, rearrangement of parts, or omission of parts may be resorted to without departing from my invention or sacrificing any of the advantages thereof, as will fully appear in the subjoined claims.

Having thus described my invention, what I claim is,—

1. In a device of the character described, a hollow body having its sides serrated at its outer end and being provided with a tubular outlet and with a wall having an inlet, said wall forming a plane contact-surface adapted to bear against the object to be cleaned.

2. In a device of the character described, a hollow body having a contact wall provided with an inlet-opening and having serrations around its edge facing laterally.

3. In a device of the character described, a hollow body provided with a tubular extension and having a plane contact-surface and an inlet-opening whose walls are serrated, said inlet-opening being in the wall forming said plane contact-surface and said hollow body being also provided with serrations around its perimeter.

4. In a device of the character described, a hollow substantially conical body having a tubular handle and a plane contact-surface provided with a circular series of radially disposed elongated openings whose confining walls are serrated.

5. In a device of the character described, a hollow body having a tubular handle and a plate secured to one side of said body and provided with an inlet-opening; said plate having its edge serrated and being also serrated along the walls of said opening.

In testimony whereof, I have affixed my signature in the presence of two subscribing witnesses.

BART LOBEE.

Witnesses:
ELLA C. PLUECKHAHN,
MATILDA C. STICHT.